United States Patent [19]

White

[11] Patent Number: 5,183,123
[45] Date of Patent: Feb. 2, 1993

[54] INDICATING MEANS FOR A ROCK BIT LUBRICATING SYSTEM

[75] Inventor: Kenneth M. White, Calgary, Canada

[73] Assignee: Western Rock Bit Company Limited, Alberta, Canada

[21] Appl. No.: 813,979

[22] Filed: Dec. 26, 1991

[30] Foreign Application Priority Data

Nov. 13, 1991 [CA] Canada .................. 2055399

[51] Int. Cl.$^5$ ............................................. E21B 10/24
[52] U.S. Cl. .................... 175/228; 175/229; 175/371
[58] Field of Search ............. 175/227, 228, 229, 371, 175/99, 40

[56] References Cited

U.S. PATENT DOCUMENTS

| | | | |
|---|---|---|---|
| 3,303,898 | 10/1963 | Bercaru | 175/228 |
| 3,844,364 | 10/1974 | Crow | 175/228 |
| 4,161,223 | 7/1979 | Oelke | 175/228 |
| 4,181,185 | 1/1980 | Keller et al. | 175/229 |
| 4,183,416 | 1/1980 | Walters | 175/228 |
| 4,274,498 | 6/1981 | Penny | 175/228 |
| 4,428,442 | 1/1984 | Steinke . | |
| 4,446,933 | 5/1984 | Bodine | 175/228 |
| 4,548,280 | 10/1985 | Daly et al. | 175/228 |
| 4,552,228 | 11/1985 | Evans et al. | 175/228 |
| 5,072,795 | 12/1991 | Delgado et al. | 175/228 |

FOREIGN PATENT DOCUMENTS

| | | |
|---|---|---|
| 715919 | 8/1965 | Canada . |
| 1138421 | 12/1982 | Canada . |
| 1148137 | 6/1983 | Canada . |
| 1264318 | 1/1990 | Canada . |

Primary Examiner—Ramon S. Britts
Assistant Examiner—Frank S. Tsay
Attorney, Agent, or Firm—Hoffmann & Baron

[57] ABSTRACT

In order to detect when a lubricant is nearly depleted in a lubricant reservoir provided in a sealed rotary cutter rock drill bit, compressed air used for removal of cuttings is passed through a valve in the reservoir. As the lubricant is used up a compressed spring gradually extends. In one embodiment, eventually a vent hole in the valve is opened causing a large pressure drop signifying an empty condition of the reservoir. In another embodiment, the valve is closed when the lubricant is depleted, giving rise to a sudden rise in pressure also signifying an empty condition.

10 Claims, 2 Drawing Sheets

INDICATING MEANS FOR A ROCK BIT LUBRICATING SYSTEM

FIELD OF THE INVENTION

This invention relates to the lubrication system as would be found in rotary rock bits having sealed lubricated bearings and, more particularly, to the lubrication system as would be used on a gaseous fluid cooled rock bit used predominantly in the mining blast hole drilling industry and occasionally in oil and geothermal well drilling applications.

BACKGROUND OF THE INVENTION

Sealed lubricated bearings in rotary rock bits are well known in the oilfield. Herein a lubrication reservoir having pressure differential compensation means is generally remotely located from the bearing structure. A lubrication passage extends from this reservoir to the particular cone bearing it serves. The lubricants are generally of a type having a high temperature resistance, such that they are not degraded due to the operating conditions encountered in the well borehole. Characteristic of all these systems is that they are enclosed and covered for protection from the drilling environment. This necessarily means there is no readily available way to indicate the quantity of lubricant in a particular lubrication reservoir at the time the rock bit is pulled form the hole or attached to rerun.

SUMMARY OF THE INVENTION

It is the objective of this invention to provide a means to indicate in a relative manner the quantity of lubricant remaining in a lubrication reservoir. This means will allow for both manual and remote sensing of the lubrication system such that a rock bit with insufficient lubricant is not run or a bit that suffers a seal failure can be removed from service prior to more serious damage occurring. Further advantages to the proposed system be obvious to those skilled in the art and will be outlined in due course.

To accomplish the aforementioned objectives a rotary rock bit having a typical configuration of lubrication reservoir has routed through the space between the compensator and the compensator cap the cooling air that is to be supplied to the bearing. Modifications are made to the grease system to include the addition of a preload spring and air valve such that when the lubricant reservoir is approaching the empty condition, the valve in one embodiment is vented causing a pressure reduction that is observed on the air pressure gauge in the operator's cab such that drilling can stop and the bit can be regressed. In another embodiment of the invention, the valve is closed when the reservoir approaches the empty condition causing a pressure increase. Since the valve is readily visible and can be manually opened when the rock bit is being readied to drill, a relative indication of the lubricant remaining can be made by noting the force required to open the valve on a new bit and the bit presently under consideration. A further advantage of the proposed system is that the grease piston, spring and valve form an ideal heat transfer unit and helps to maintain a low operating temperature on the lubricant in the reservoir.

More generally, the present invention provides a sealed lubricated rotary cutter rock drill bit having a lubricant reservoir connected via first passage means to bearing surfaces, the lubricant reservoir containing a valve controlling flow of a fluid along second passage means intersecting the lubricant reservoir, the valve being movable as the lubricant in the lubricant reservoir depletes to cause a variation in the pressure of the fluid in the second passage means whereby the amount of lubricant in the lubricant reservoir can be gauged by monitoring the pressure of the fluid in the second passage means.

DETAILED DESCRIPTION OF THE PREFERRED EMBODIMENT

Figure 1:
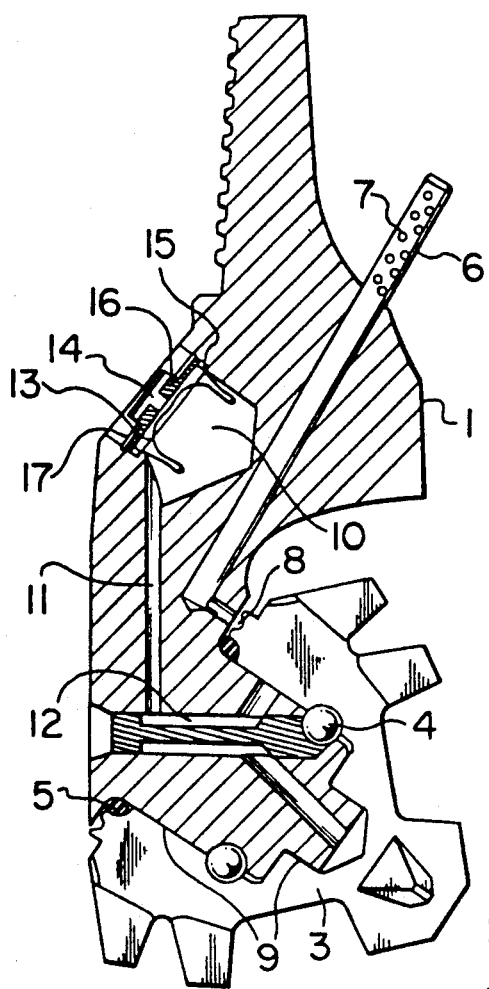
FIG. 1 is a cross-sectional view through a head section of a typical prior art type sealed, lubricated, air cooled rotary rock bit.

The prior art rock bit sub-assembly shown in FIG. 1 is generally one of three employed in conventional rotary rock bit drilling. Head section 1 has threads 2 form releasable attachment to a drill string (not shown) and cutter cone 3 retained by ball bearings 4 and having in this case an elastomer seal 5. Air type bits have a strainer tube 6 with a multiplicity of holes 7 to allow cooling and cleaning air to either flush the bearings if the bit is a roller ball type or to pressurize and cool the seal area 8 if the bit is a journal bearing type 9 as is illustrated here. Lubrication for the bearing surfaces is provided from a reservoir 10 through a passageway 11, along a relief groove 12 to the journal surfaces. During working operation, as lubricant is removed from reservoir 10, an elastomer diaphragm or compensator 13 extends into the reservoir, and a vacuum relief passageway 14 is provided in a compensator cap 16 such that the compensator can freely extend. An elastomer coated ring shown at 15 coacts with a lip on the compensator 13 and cap 16 such that the compensator allows for removal of grease from reservoir 10 but protects the grease from contamination entering through passageway 14. The whole assembly is secured in place by a retaining ring 17. This system is very common and is used in one form or another by all rock bit manufacturers.

Figure 2:
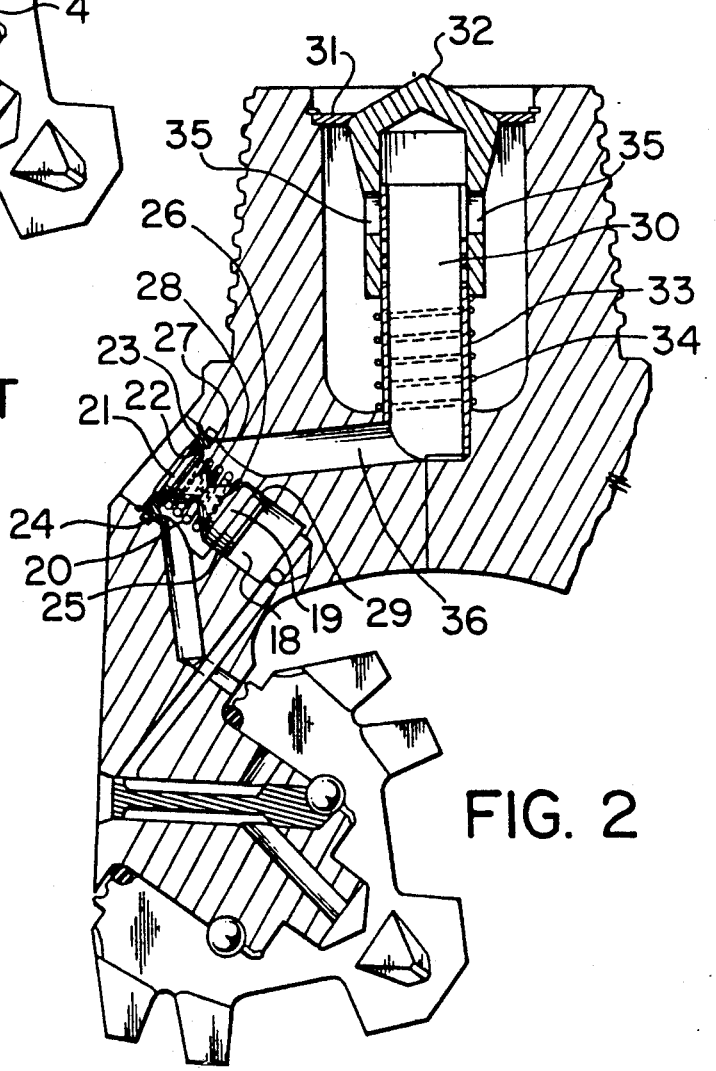
FIG. 2 is a corresponding section of the inventive system having a lubrication reservoir in the new condition.

The inventive system shown in FIG. 2 operates in generally the same manner as the prior art configurations with some important differences illustrated here. Grease reservoir 18 has a compensator piston 19 with an activator spring 20. An air valve 21 seals against a seat 22 in a compensator valve cap 23 when the activator spring 20 is under compression. Elastomer "O" rings are provided at 24 to seal the compensator valve cap 23 and at 25 to seal the compensator piston. Activator spring 20 is of a retaining fit over extensions 26 on the compensator piston 19 and 27 on the air valve 21. It is noted that the extensions 26 and 27 abut at 28 when the drill bit is in the new condition shown in FIG. 2. It is also noted that the compensator piston 19 and sealing "O" ring 25 are in the maximum compressed position. There is a conical taper at 29 such that sealing "O" ring 25 in this maximum compressed position is allowed to leak a small quantity of grease. This is done to allow for relief of excessive pressure build-up in the lubrication system and to prevent overfilling of the system during regreasing. The overall length of the air valve 21, activator spring 20, and compensator piston 19 is such that the piston 19 will not leave the grease reservoir 18 under the maximum compressed position conditions and the conical taper 29 will provide for ready compensation of the "O" ring seal 25.

The back-flow water separation valve assembly shown at 30 is not necessary for effective operation of the lubrication system but is shown for illustrative purposes only. The system consists of a valve plate 31, a sliding piston 32, an air tube 33 and a compression spring 34. The rotary rock bit of FIG. 2 is shown in the non-working condition and sliding piston 32 is co-acting with valve plate 31 to seal the bore of the attached drill pipe. Noted also is that air delivery passageways 35 on piston 32 are sealed by an undrilled portion of air tube 33, such that the airway 36 leading to the lubrication system and/or bearings is sealed. Compression spring 34 is in the pre-load condition in this position.

Figure 3:
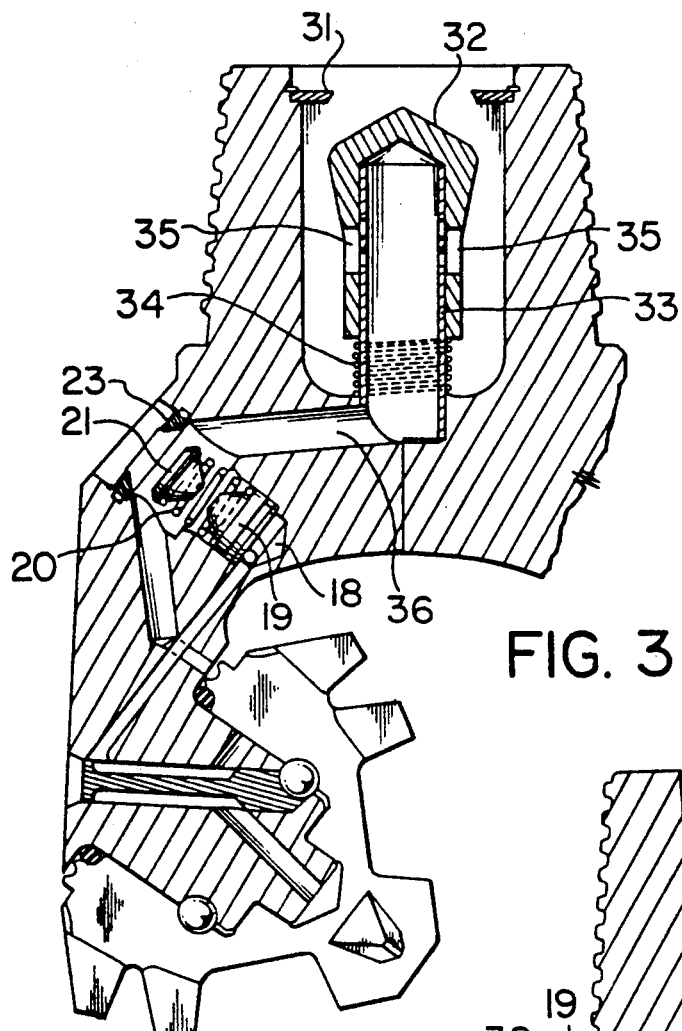
FIG. 3 is a view similar to that of FIG. 2 but with the lubricant exhausted.

The rotary rock bit shown in FIG. 3 is as if the lubricant supply were exhausted and the full air pressure of the drilling machine were applied. Lubricant supply in reservoir 18 is at the minimum and compensator piston 19 is at its innermost position. Activator spring 20 is fully extended and air valve 21 has been moved away from its sealing engagement with compensator cap 23 such that the majority of the cooling/cleaning air is exhausted through the hole in compensator cap 23. This causes a reduction in the air pressure gauge reading in the operator's cab such that drilling can be stopped to regrease or change the rock bit. Unless there is a catastrophic failure of seal 5 (FIG. 1) there is a substantial time span over which the lubricant in reservoir 18 is being depleted and therefore numerous opportunities to check the pressure required to open the air valve 21 during the life of the rock bit. The hole in compensator cap 23 is generally ⅛" larger in diameter than the size of the air nozzles in the rock bit; this yields a sufficient drop in the gauge pressure to be noticeable. It is noticed that the fully extended length of activator spring 20 determines the open cross-sectional area of the hole in the compensator cap to the extent that the air valve 21 must move away from the compensator cap 23 such that the air flow through the hole is not restricted. Nominally activator spring 20 should have a fully compressed force of from 50 to 60 pounds in a system sized for 9⅞" through 12¼" rotary rock bit sizes. The fully extended length would be approximately 1¼" by way of example only.

Dealing further with the back-flow water separator valve assembly of FIG. 2, herein the valve is illustrated as through the full air pressure of the drill is being applied. Sliding piston 32 is fully away from valve plate 31 allowing complete and unrestricted air flow. Air delivery passageways 35 align with their counterparts in air tube 33, such that air is free to flow from the central bore through air tube 33 along passage 36 and in the condition shown in FIG. 3 out through the hole in compensator cap 23, and compression spring 34 is fully compressed. The fully compressed force required against compression spring 34 is from 5 to 7 pounds (9⅞"-12¼" bit size).

Figure 4:
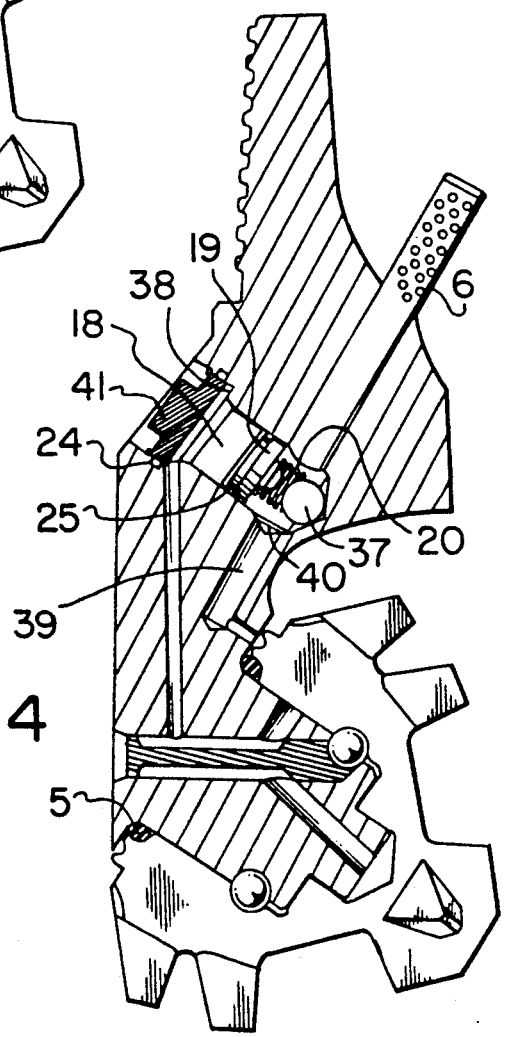
FIG. 4 is a view similar to FIG. 2 but illustrating an alternative system wherein the low lubricant warning causes an increase in gauge pressure as opposed to a reduction in air pressure.

The alternate system shown in FIG. 4 is illustrated with common components having like numerical identification. Herein though not necessarily required a strainer tube 6 supplies air for cooling/cleaning of the seal area or bearings from the central bore. Compensator piston 19 is positioned in a reservoir 18 containing the rock bit bearing lubricant. Activator spring 20 is shown fully compressed and is of similar specifications to FIG. 2 and FIG. 3. A ball bearing, valve ball 37 having a diameter approximately equal to the inside diameter of strainer tube 6 but larger than the inside diameter of activator spring 20 is retained in the position shown by the compression of activator spring 20. In this case compensator cap 41 does not have an exhaust hole. Elastomer "O" ring seal 24 is provided to prevent loss of lubricant from reservoir 18 as is "O" ring 25. It is noted that compensator cap 41 does not rest against seat 38 but is free to move inwardly against the force of activator spring 20. This is such that by pushing against the compensator cap 41 and compressing activator spring 20 an indication by comparison can be made of the quantity of lubricant in reservoir 18.

Drilled air supply hole 39 is smaller in diameter than strainer tube 6 such that when activator spring 20 becomes fully extended due to the compensator piston 19 moving outwards as the lubricant supply becomes exhausted valve ball 37 will seal the air supply 36. Sealing of the air flow out of supply hole 39 causes a rapid increase in the gauge pressure noted in the operator's cab. Note in the drawing that the drilled hole for strainer tube 6 forms a partial start 40 for air supply hole 39. It is important that the penetration of the partial start 40 not be so great that the offset of the center of valve ball 37 can exceed the outside radius of activator spring 20. In the event that this occurs regreasing of the rock bit would not return activator ball 37 to the position shown in FIG. 4.

The operation of a system of this nature is progressive in that once the activator spring reaches its fully extended position, the only force acting on the compensator piston 19 is the restriction pressure generated in the air flow passages from strainer tube 6 and supply hole 39. A partial vacuum occurs in the reservoir 18 as lubricant is gradually depleted past seal 5. This allows sufficient time over the life of the rock bit to check the quantity of lubricant remaining in the reservoir as outlined earlier.

What I claim as my invention is:

1. A sealed lubricated rotary cutter rock drill bit having a lubricant reservoir connected via first passage means to bearing surfaces, the lubricant reservoir containing a valve controlling flow of a fluid along second passage means intersecting the lubricant reservoir, means for causing the valve to move as the lubricant in the lubricant reservoir depletes to cause a variation in the pressure of the fluid in the second passage means whereby the amount of lubricant in the lubricant reservoir can be gauged by monitoring the pressure of the fluid in the second passage means.

2. A sealed lubricated rotary cutter rock drill bit according to claim 1 wherein the fluid is a gaseous cooling and cutting removal fluid and the second passage means communicates with means for delivering the fluid and means for passing the fluid to the cutters.

3. A sealed lubricated rotary cutter rock drill bit according to claim 2 wherein the fluid is compressed air.

4. A sealed lubricated rotary cutter rock drill bit according to claim 2 in which the valve is normally open when the lubricant reservoir is full and is vented to atmosphere when the lubricant reservoir is depleted.

5. A sealed lubricated rotary cutter rock drill bit according to claim 3 in which the valve is normally open when the lubricant reservoir is full and is vented to atmosphere when the lubricant reservoir is depleted.

6. A sealed lubricated rotary cutter rock drill bit according to claim 2 in which the valve is normally open when the lubricant reservoir is full and is closed when the lubricant reservoir is depleted.

7. A sealed lubricated rotary cutter rock drill bit according to claim 3 in which the valve is normally open when the lubricant reservoir is full and is closed when the lubricant reservoir is depleted.

8. A sealed lubricated rotary cutter rock drill bit according to claim 1 in which spring means is provided in the lubricant reservoir for pushing lubricant out of the reservoir and manually tactile means are provided to sense the spring force at any particular time thereby to indicate the amount of lubricant remaining in the reservoir.

9. A sealed lubricated rotary cutter rock drill bit according to claim 2 in which spring means is provided in the lubricant reservoir for pushing lubricant out of the reservoir and manually tactile means are provided to sense the spring force at any particular time thereby to indicate the amount of lubricant remaining in the reservoir.

10. A sealed lubricated rotary cutter rock drill bit according to claim 3 in which spring means is provided in the lubricant reservoir for pushing lubricant out of the reservoir and manually tactile means are provided to sense the spring force at any particular time thereby to indicate the amount of lubricant remaining in the reservoir.

* * * * *

UNITED STATES PATENT AND TRADEMARK OFFICE
CERTIFICATE OF CORRECTION

PATENT NO. : 5,183,123

DATED : February 2, 1993

INVENTOR(S) : Kenneth M. White

It is certified that error appears in the above-identified patent and that said Letters Patent is hereby corrected as shown below:

Please rewrite Claim 4 as follows:

4. A sealed lubricated rotary cutter rock drill bit according to claim 2 including a vent-to-atmosphere provided in the second passage means, the valve sealing the vent when the lubricant reservoir is full thereby providing normal fluid pressure in the second passage means and the valve being moved to unseal the vent when the lubricant reservoir is depleted thereby providing a reduced fluid pressure in the second passage means.

Please rewrite Claim 5 as follows:

5. A sealed lubricated rotary cutter rock drill bit according to claim 3 including a vent-to-atmosphere provided in the second passage means, the valve sealing the vent when the lubricant reservoir is full thereby providing normal fluid pressure in the second passage means and the valve being moved to unseal the vent when the lubricant reservoir is depleted thereby providing a reduced fluid pressure in the second passage means.

Please rewrite Claim 6 as follows:

6. A sealed lubricated rotary cutter rock drill bit according to claim 2 in which the valve is normally open when the lubricant reservoir is full thereby providing normal fluid pressure in the second passage means and is closed when the lubricant reservoir is depleted thereby providing an increased fluid pressure in the second passage means.

UNITED STATES PATENT AND TRADEMARK OFFICE
CERTIFICATE OF CORRECTION

PATENT NO. : 5,183,123

DATED : February 2, 1993

INVENTOR(S) : Kenneth M. White

It is certified that error appears in the above-identified patent and that said Letters Patent is hereby corrected as shown below:

Please rewrite Claim 7 as follows:

14. A sealed lubricated rotary cutter rock drill bit according to claim 3 in which the valve is normally open when the lubricant reservoir is full thereby providing normal fluid pressure in the second passage means and is closed when the lubricant reservoir is depleted thereby providing an increased fluid pressure in the second passage means.

Signed and Sealed this

Thirtieth Day of November, 1993

Attest:

BRUCE LEHMAN

Attesting Officer

Commissioner of Patents and Trademarks